United States Patent
Chheda et al.

(10) Patent No.: US 6,181,738 B1
(45) Date of Patent: Jan. 30, 2001

(54) REVERSE LINK POWER CONTROL USING A FRAME QUALITY METRIC

(75) Inventors: Ashvin Chheda, Dallas; Ahmad Jalali, Plano, both of TX (US)

(73) Assignee: Northern Telecom Limited, Montreal (CA)

( * ) Notice: Under 35 U.S.C. 154(b), the term of this patent shall be extended for 0 days.

(21) Appl. No.: 09/023,849

(22) Filed: Feb. 13, 1998

(51) Int. Cl.[7] .................................................... H04B 3/46
(52) U.S. Cl. .......................... 375/224; 370/252; 455/522
(58) Field of Search .................................. 375/140, 221, 375/224, 252, 296, 225; 370/252, 320, 335, 391, 441, 465; 455/69, 522

(56) References Cited

U.S. PATENT DOCUMENTS

| | | | |
|---|---|---|---|
| 5,537,410 | * 7/1996 | Li ........................................ | 370/465 |
| 5,604,730 | * 2/1997 | Tiedemann, Jr. .................... | 370/252 |
| 5,812,938 | * 9/1998 | Gilhousen et al. ................... | 455/69 |
| 5,822,318 | * 10/1998 | Tiedemann, Jr. et al. ........... | 370/391 |
| 5,839,056 | * 11/1998 | Hakkinen .............................. | 455/69 |
| 5,933,781 | * 8/1999 | Willenegger et al. ............... | 455/522 |
| 5,963,870 | * 10/1999 | Chheda et al. ....................... | 455/522 |
| 5,991,284 | * 11/1999 | Willenegger et al. ............... | 370/335 |

* cited by examiner

*Primary Examiner*—Stephen Chin
*Assistant Examiner*—Chieh M. Fan
(74) *Attorney, Agent, or Firm*—John D. Crane

(57) ABSTRACT

When the frame rate changes from eighth rate to full rate, the power control process increases the $E_b/N_o$ target by $\Delta_1$. If the frame rate changes from full rate to eighth rate, the power control process decreases the $E_b/N_o$ target by $\Delta_2$. In both cases, a decision threshold for a Frame Quality Metric is determined. If the Frame Quality Metric is less than the threshold, normal power control is resumed. If the Frame Quality Metric is greater than or equal to the threshold, the newly set target $E_b/N_o$ is decreased by $A_3$. The target $E_b/N_o$ is continually decreased by A until the frame rate changes or the target reaches the required $E_b/N_o$, indicated by a bad frame or lower frame quality metric (i.e., lower than the frame quality threshold).

12 Claims, 5 Drawing Sheets

REVERSE LINK POWER CONTROL USING A FRAME QUALITY METRIC

BACKGROUND OF THE INVENTION

I. Field of the Invention

The present invention relates to radio communications. More particularly, the present invention relates to improving reverse link capacity in a radiotelephone system.

II. Description of the Related Art

Multiple access techniques are designed to make efficient use of the limited radio frequency spectrum. Examples of such techniques include time division multiple access (TDMA), frequency division multiple access (FDMA), and code division multiple access (CDMA).

CDMA wireless technology, governed by Electronic Industry Association/Telecommunication Industry Association Interim Specification-95 (IS-95), employs a spread spectrum technique for the transmission of information. A spread spectrum system uses a modulation technique that spreads the transmitted signal over a wide frequency band. This frequency band is typically substantially wider than the minimum bandwidth required to transmit the signal.

A form of frequency diversity is obtained by spreading the transmitted signal over a wide frequency range. Since only part of a signal is typically affected by a frequency selective fade, the remaining spectrum of the transmitted signal is unaffected. A receiver that receives the spread spectrum signal, therefore, is affected less by the fade condition than a receiver using other types of signals.

The spread spectrum technique is accomplished by modulating each base band data signal to be transmitted with a unique wide band spreading code. Using this technique, a signal having a bandwidth of only a few kilohertz can be spread over a bandwidth of more than a megahertz. Typical examples of spread spectrum techniques are found in M.K. Simon, *Spread Spectrum Communications*, Volume I, pp. 262–358.

In a CDMA-type radiotelephone system, multiple signals are transmitted simultaneously on the same frequency. A particular receiver then determines which signal is intended for that receiver by the unique spreading code in each signal. The signals at that frequency, without the particular spreading code intended for that particular receiver, appear to be noise to that receiver and are ignored.

Since multiple radiotelephones and base stations transmit on the same frequency, power control is an important component of the CDMA modulation technique. A higher power output by a radiotelephone and/or base station increases its signal quality but also increases the interference experienced by the other radiotelephones and base stations in the system. In order to keep the radiotelephones and base stations from transmitting at too much power, thereby decreasing system capacity, some form of power control must be implemented.

The radiotelephone can aid the base station in the control of the power on the forward link (from the base station to the radiotelephone) by feedback on the reverse link (from the radiotelephone to the base station). This is accomplished by either a power control message that is sent when appropriate thresholds are triggered or an erasure indicator bit on a reverse link frame that indicates the status of a previously sent forward link frame. The base station may then adjust its power level to the specific user accordingly. This is referred to in the art as forward link power control.

The ratio $E_b/N_o$ is a standard quality measurement for digital communications system performance. The ratio expresses the bit-energy-to-noise-density of the received signal. $E_b/N_o$ can be considered a metric that characterizes the performance of one communication system over another similar conditions; the smaller the required $E_b/N_o$ for a given grade of service, the more efficient is the system modulation and detection process. A more detailed discussion of this concept can be seen in B. Sklar, *Digital Communications, Fundamentals and Applications*, Chapter 3 (1988).

Each user on the reverse link is an interferer to the other users. Increasing the $E_b/N_o$ of a particular user translates to an increase in the user's received bit energy ($E_b$). This causes an increased noise density ($N_o$) that other users detect.

Therefore, it is essential to allocate each user or reverse traffic channel the required amount of $E_b/N_o$ to achieve and sustain the reverse link at a given frame error rate (FER) or grade of service (GOS). Providing less than the required amount increases the drop call probabilities and FERs. Allocating an excessive amount of $E_b/N_o$ results in a reduction in reverse link network capacity and coverage.

The required $E_b/N_o$ is dynamic in that it depends on the mobile velocity, the fading characteristics, the multi-path environment, and the soft/softer hand-off status. Therefore, a dynamic reverse link power control process for controlling the required $E_b/N_o$ is essential to maximize reverse link network capacity.

A typical prior art reverse link power control process is illustrated in FIG. 1. This process is used by the base station in determining whether to transmit a power up or power down command to the radiotelephone.

The base station receives information from the radiotelephone. This information is in the form of a stream of data frames. The type and format of this data is well known in the art.

The base station demodulates (step 101) the information. The $E_b/N_o$ is measured (step 105), for a power control group duration (a sixteenth of a frame). The measured $E_b/N_o$ is compared (step 115) to a target $E_b/N_o$. The target $E_b/N_o$ is adjusted on a frame by frame basis. The target is modified (step 110) in such a way as to maintain the required frame error rate (FER). The network operators typically set the FER target.

In order to modify the target $E_b/N_o$, the quality of each received frame is determined (step 125). If a particular received frame was good, the target is decreased a predetermined amount. If the particular received frame was bad, the target is increased a predetermined amount. The network operators set the predetermined amount. The principles behind determining the quality of the frames is well known in the art and is discussed in John G. Proakis, *Digital Communications*, Chapter 7.

If the measured $E_b/N_o$ is less than the target $E_b/N_o$, the base station instructs (step 120) the radiotelephone to power up by a predetermined amount, typically 1.0 dB. If the measured $E_b/N_o$ is greater than the target $E_b/N_o$, the radiotelephone instructs (step 120) the base station to power down by a predetermined amount, typically 1.0 dB.

The reverse link power control process is based on an outer loop process and an inner loop process. The outer loop process corrects the $E_b/N_o$ target requirement based on the performance of the reverse traffic channel on a frame by frame basis. Frame rate and quality determination is based on the cyclic redundancy code (CRC) employed and associated algorithms. Each time a frame is received, a CRC check is performed four times, once for each frame rate. If all the CRC's fail, the frame is labeled an erasure (bad frame). If one passes, the frame rate is determined as the rate corresponding to the CRC check. If more than one passes, the CRC check yielding the lowest symbol error rate is used as an indication of the frame rate.

The outer loop process is a function of the required FER. As the radiotelephone moves, the $E_b/N_o$ required to maintain communication to a given FER changes. If a frame is good, the target $E_b/N_o$ is reduced marginally. This $E_b/N_o$ reduction continues in steps for each good frame received.

If a bad frame is received, the environment must have changed requiring a higher $E_b/N_o$. In this case, the target $E_b/N_o$ is increased by a large step in order to reduce the chances of not increasing the target enough. If the target is now larger, the measured $E_b/N_o$ is less per power control group and the base station(s) sends power up commands to the radiotelephone. Assuming the larger target $E_b/N_o$ is sufficient, good frames result and the process slowly steps down the target $E_b/N_o$ again. The up and down step sizes are coupled mathematically to meet the required FER target set by operators.

The inner loop power control process estimates or measures the $E_b/N_o$ over one power control group of 1.25 ms. The measured $E_b/N_o$ is compared to the target $E_b/N_o$. Based on the comparison, a power up or power down command is sent by the base station(s) to the radiotelephone on the forward traffic channel.

The reverse link power control process discussed above attempts to track the change in $E_b/N_o$ requirements as the mobile velocity, fading conditions, and multipath profile change. This prior art reverse link power control process fails to operate efficiently when the frame rate changes.

Each frame rate is designed to operate at a different target FER. For example, full rate frames typically operate at 1–2% FER targets and eighth rate frames typically operate at 5% FER. The eighth rate frames operate at a higher FER because they can do this without affecting voice quality. As a result, this should provide a higher reverse link capacity; i.e., a lower $E_b/N_o$ means a higher capacity and of course higher FER. The full rate frames operate at a lower FER since any higher FERs would affect the voice quality of the system. The different targets result in different $E_b/N_o$ requirements under similar radio frequency conditions. Even for the same target FER, the $E_b/N_o$ requirement may be different for different rates due to different speeds of power control at the different rates.

The time in a particular rate before a rate change is significant since the reverse link power control process requires a certain time to correct for the different $E_b/N_o$ requirements. For example, the $E_b/N_o$ requirement for the eighth rate may be 1.5–2.0 dB less than the full rate. Therefore, when the rate changes from eighth to full rate, the current $E_b/N_o$ is initially insufficient to meet the 1% FER for full rate. Similarly, when the rate changes from full rate to eighth rate, the resulting $E_b/N_o$ is initially more than sufficient to meet the 5% FER.

If the radiotelephone remained in a particular rate for a long enough period of time, this effect would be averaged out and the FER targets would be met. However, the duration of frames in the different rates is bursty and small, resulting in a performance degradation. The end result is that the radiotelephone is unable to meet a 1% full rate FER target and a 5% eighth rate FER target. Additionally, RF conditions changing complicate this process. There is a need for a power control process that can rapidly update reverse link $E_b/N_o$ requirements during rate changes.

SUMMARY OF THE INVENTION

The reverse link power control process of the present invention operates in a radiotelephone system comprising a plurality of base stations and a radiotelephone. The process uses the Frame Quality Metric as a step controlling mechanism to optimize the reverse link power control during rapid rate changes.

The process monitors the channel to determine if the frame rate has changed. If the frame rate changed from a higher frame rate to a lower frame rate, the target $E_b/N_o$ is decreased by a first predetermined delta. In the preferred embodiment, the higher rate is full rate and the lower rate is eighth rate. Since the frame rate is now eighth rate, an eighth rate decision threshold is determined. In the preferred embodiment, the decision threshold is a frame quality metric of 248 based on the cyclic redundancy code (CRC).

If the frame rate changed from a lower frame rate to a higher frame rate, the target $E_b/N_o$ is increased by a second predetermined delta. Since the frame rate is now full rate, a full rate decision threshold is determined. In the preferred embodiment, this decision threshold is a frame quality metric of 248 based on the CRC.

A Frame Quality Metric for each received frame is then determined. If the Frame Quality Metric is greater than the appropriate decision threshold, depending on the frame rate, the target $E_b/N_o$ is updated by subtracting a third delta from the $E_b/N_o$. Consequently, the process of the present invention impacts the outer loop of reverse link power control, i.e., the loop that deals with the updating of the target $E_b/N_o$.

The reverse link transmit power is then adjusted by the base station(s) transmitting power control commands to the radiotelephone. The power control commands instruct the radiotelephone to adjust its power in response to the comparison of measured to target $E_b/N_o$.

DETAILED DESCRIPTION OF THE PREFERRED EMBODIMENT

Figure 1:
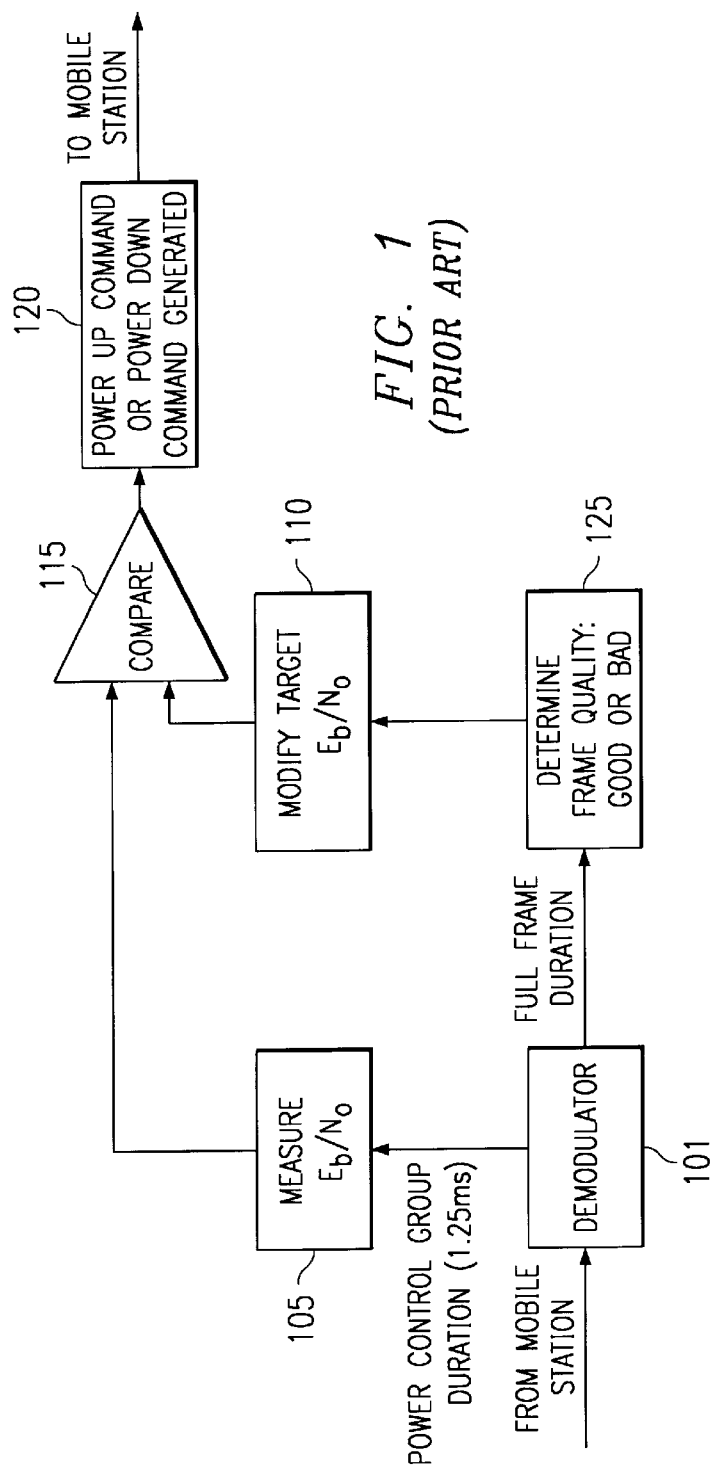
FIG. 1 shows a typical prior art reverse link power control process.

The reverse link power control process of the present invention optimizes the reverse link power control during frame rate changes. This is accomplished by using the Frame Quality Metric as a power step controlling mechanism.

Rate Sets 1 and 2 frame structures are defined in the IS-95A standard. Rate Set 1 uses transmitted frame rates of 9600 bits per second (bps), 4800 bps, 2400 bps, and 1200 bps. Rate Set 2 uses transmitted frame rates of 14400 bps, 7200 bps, 3600 bps, and 1800 bps.

Each frame transmitted at rate set 2 and the 9600 and 4800 bps frames of rate set 1 include frame quality indicator bits, that are used to determine the Frame Quality Metric. This quality indicator is a cyclic redundancy code (CRC) that performs two functions. The CRC determines if the frame is in error and assists in determining the data rate of the received frame.

The Frame Quality Metric is calculated based on all bits within the frame, except the Frame Quality Indicator bits and the encoder tail bits. The 14400 bps frames of rate set 2 and the 9600 bps frames of rate set 1 use a 12 bit Frame Quality Indicator. The 7200 bps frames of rate set 2 use a 10 bit Frame Quality Indicator. The 4800 bps frames of rate set 1 and the 3600 bps frames of rate set 2 use an 8 bit Frame Quality Indicator. Additionally, the 1800 bps frames of rate set 2 use a 6 bit Frame Quality Indicator. The calculation of these reverse link Frame Quality Indicators is well known in the art and discussed in greater detail in the IS-95 specification.

The Frame Quality Metrics are used in CDMA systems during a soft hand-off between two base stations. Since the base station controller is receiving the same frame from two different base stations, the Frame Quality Metric is used to determine which frame to use: the frame with the highest Frame Quality Metric.

The CRC for each rate is checked, as well as the symbol error rate. If more than one CRC passes, the rate is chosen to correspond to the one with the lowest number of symbol errors. If none of the CRCs pass, the frame is termed an erasure.

Using the CRCs, the Frame Quality Metric is determined by the following:

Frame Quality=0 for a frame erasure (none of the 4 CRC's passed);

else,

Frame Quality=[{(4−N)<<6}+{(255−$S_t$)>>2}];

where N is the number of CRCs that passed (1, 2, 3, or 4) and $S_t$ is the number of symbol errors in the frame, based on the assumed rate. The notations << and >> represent left-shifting and right-shifting, respectively, of binary numbers.

The symbol error rate is determined by re-encoding the output of the Viterbi decoder. The resulting frame is compared to the original frame prior to the Viterbi decoding (Prior to the Viterbi decoding, the correlator outputs soft values. A hard decision is made on these values and this is what is compared to the re-encoded Viterbi output.). For example, if only one CRC passes and there are five symbol errors in the frame, the frame quality is calculated by the above equation as follows:

4−1=is $(0000\ 0011)_2$>>6=1100 0000

255−5=250 is $(1111\ 1010)_2$>>2=0011 1110 adding these numbers results in: $\overline{1111\ 1110}=(254)_{10}$.

It is possible that more than one CRC would pass.

In the preferred embodiment, the Frame Quality Metric is typically in the range of 210 to 255 for a good frame. However, the lower portion of that range may not always render a good frame. A Frame Quality Metric of 248 is considered average for a good frame. Alternate embodiments have other Frame Quality Metric ranges and averages for good frames. Additionally, the Frame Quality Metric may be calculated using different methods.

Figure 2:
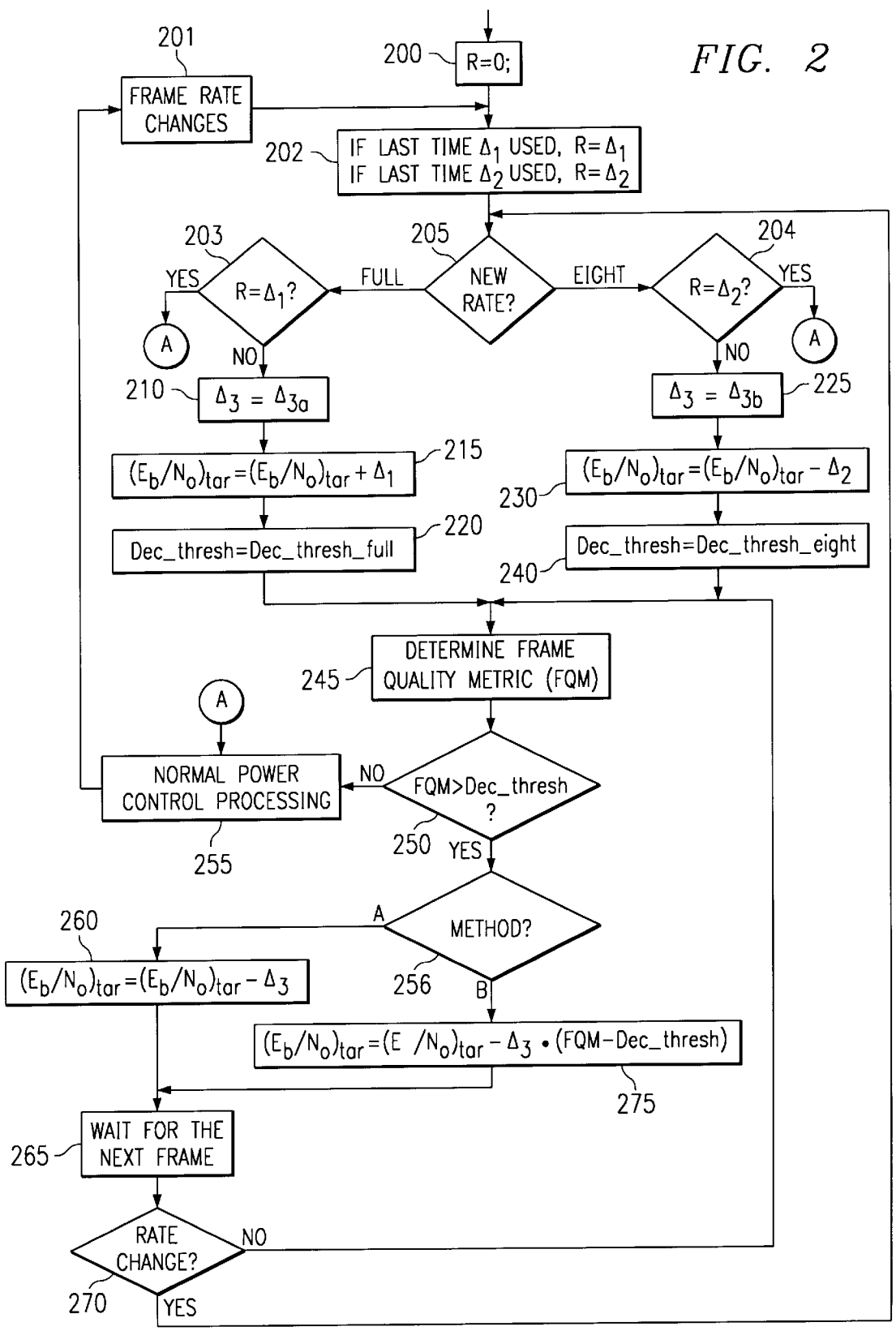
FIG. 2 shows a flowchart of the target $E_b/N_o$ update process of the present invention.

A flowchart of the reverse link power control process of the present invention is illustrated in FIG. 2. A variable is first initialized to zero (step 200). In the preferred embodiment, this variable is subsequently referred to as R.

R keeps track of which step controlling mechanism ($\Delta_1$ or $\Delta_2$) was previously used. In the preferred embodiment, the step controlling mechanisms should be used only if the new rate of full occurs after the step controlling mechanisms are used on eighth rate frames and vice versa. This is illustrated in FIG. 6.

Alternate embodiments use other ways to track the previous step controlling mechanism. One such embodiment uses a flag for $\Delta_1$ and a second flag for $\Delta_2$, each flag being set when that particular step controlling mechanism is used.

Figure 6:
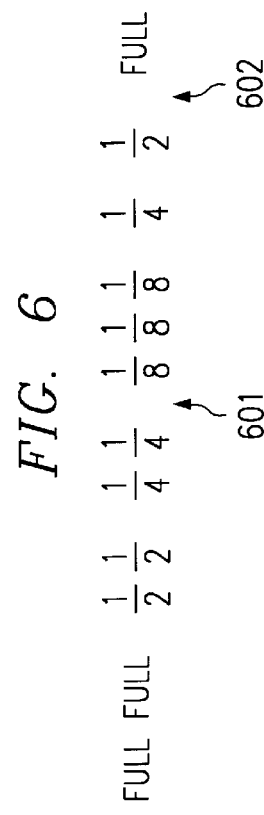
FIG. 6 shows a series of frame rates in accordance with the present invention.

FIG. 6 shows a series of frames rates. The rates progress from full rate, through the transition rates of half and quarter, to eighth rate frames. The process of the present invention is active at the quarter to eighth rate transition (601). The rates then progress from eighth to quarter to half and finally to full, with the present process being active at the half to full rate transition (602).

Figure 7:
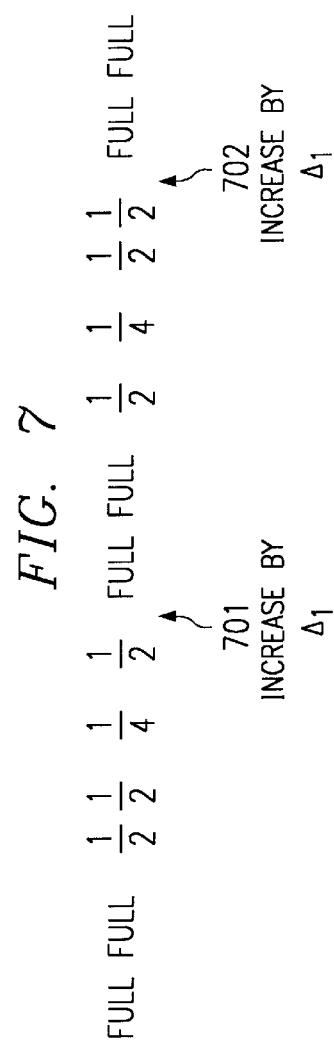
FIG. 7 shows a second series of frame rates in accordance with the present invention.

FIG. 7 illustrates a series of frame rates where not tracking the previous stepping mechanism might cause a problem. This series starts at full rate, transitions through half and quarter but then goes back through half to full rate without ever reaching eighth rate. A similar series occurs subsequently, transitioning from full through half rate, quarter rate, then back through half rate before returning to full rate again.

In both instances of transitioning from half rate to full rate (701 and 702), the $E_b/N_o$ target is increased by $\Delta_1$ without an opportunity for it to be reduced by $\Delta_2$. Using R of the present invention, if the previous stepping mechanism was $\Delta_1$ and the frame rate has changed to full rate again without an intermediate eighth rate, another increase of $\Delta_1$ is not allowed. This example also applies to multiple occurrences of eighth rate without an intervening full rate.

Referring again to FIG. 2, if during the last frame, the process of the present invention used $\Delta_1$, R is then set to $\Delta_1$ (step 202). If $\Delta_2$ was used during the last frame, R is set to $\Delta_2$ (step 202).

The new rate is then determined (step 205). If the new rate is full rate, R is checked to determine if it is $\Delta_1$ (step 203). If R is $\Delta_1$, the normal power control processing is used (255). If R is not $\Delta_1$, $\Delta_3$ is set to $\Delta_{3a}$ (step 210). The target $E_b/N_o$, is then increased by $\Delta_1$ (step 215).

In the preferred embodiment, $\Delta_1$ is a function of the environment. It may be determined by a variety of methods. In the preferred embodiment, $\Delta_1$ is determined from actual field measurements of the area under consideration for a cellular radiotelephone system. Alternate embodiments use simulation predictions or a fuzzy logic system to update the value as the radiotelephone moves.

Multiple methods, well known in the art, can be used to determine $\Delta_1$ and $\Delta_2$ that are used in the process of the present invention. The preferred embodiment uses drive testing to determine these parameters. An alternate embodiment uses computer simulation. Still other embodiments use other methods not discussed here.

Using a drive test, consider the operation of a system with an expected FER target for full rate of X% and an expected FER target of Y% at eighth rate. The drive testing is done, with the base station transmitting full rate frames only at X% target, to determine $(E_b/N_o)_{req}$ for this frame rate. For this example, assume $(E_b/N_o)_{req}$ is found to be B dB.

Similar drive testing for eighth rate frames at Y% is done to determine $(E_b/N_o)_{req}$ for that frame rate. For this example, assume $(E_b/N_o)_{req}$ is found to be C dB. The difference between the full rate and the eighth rate gives the indication that $\Delta_1$ is a little greater than (B−C) dB and $\Delta_2$ is a little less than (B−C) dB.

Referring again to FIG. 2, if the new rate is full, the decision threshold is set at the Frame Quality Metric threshold for full rate frames (step 220). In the preferred embodiment, this threshold is 248. Alternate embodiments use other thresholds.

If the new rate is eighth rate, R is checked to determine if it is set to $\Delta_2$ (step 204). If R is $\Delta_2$, the normal power control process (step 255) is used. If R is not $\Delta_2$, $\Delta_3$ is set to $\Delta_{3b}$ (step 225). The target is then decreased by $\Delta_2$ (step 230) and the decision threshold is set to the Frame Quality Metric threshold for eighth rate frames (step 240). In the preferred embodiment, this threshold is 248. Alternate embodiments use other thresholds.

The Frame Quality Metric is next determined (step 245) using the above described process. The Frame Quality Metric is compared to the decision threshold (step 250) for that particular frame rate. If the Frame Quality Metric is less than the decision threshold, normal power control processing is performed (step 255) and the process returns to monitoring the frame rate (step 201) for changes.

If the Frame Quality Metric is larger than or equal to the decision threshold for that particular frame rate (step 250), one of two methods of fine tuning the target $E_b/N_o$ can be used (step 256). One is to decrease the target $E_b/N_o$ by $\Delta_3$ (step 260) and the other is to decrease the target $E_b/N_o$ by a scaled $\Delta_3$ (step 275).

If the target $E_b/N_o$ is decreased by a scaled $\Delta_3$ (step 275), $\Delta_3$ is multiplied by the difference between the Frame Quality Metric (FQM) and the decision threshold accomplishes the scaling. This operation is illustrated by the following:

$$(E_b/N_o) = (E_b/N_o)_{tar} - \Delta_3(\text{FQM} - \text{Dec. Threshold}).$$

The scaling operation is performed as a form of weighting. In other words, the target $E_b/N_o$ is reduced by a greater amount if the frame quality is very good and a lesser amount if the frame quality is not as good. If $\Delta_3$ is not chosen properly, the process of the present invention may not operate efficiently. However, since the environment of a moving radiotelephone may change rapidly, the scaled $\Delta_3$ may not provide as robust a target adjustment as the preferred step of decreasing the target $E_b/N_o$ by $\Delta_3$ (step 260).

The value of $\Delta_3$ is a function of the environment. In the preferred embodiment, it is determined by computer simulation. After the values for $\Delta_1$ and $\Delta_2$ are determined, the best value for $\Delta_3$ is determined such that the values for $\Delta_1$ and $\Delta_2$ can be fine-tuned efficiently. In an alternate embodiment, $\Delta_3$ is determined by trial and error. Alternate embodiments use still other processes to find $\Delta_3$.

The process illustrated in FIG. 2 then waits for the next frame to be received (step 265) and determines if the frame rate has changed again (step 270). If the frame rate has changed again, the process returns to determining the new rate (step 205). If the frame rate has not changed with the next frame, the new Frame Quality Metric is determined (step 245) and the process continues as described above (steps 250–265) until the frame rate changes again.

Figure 3:
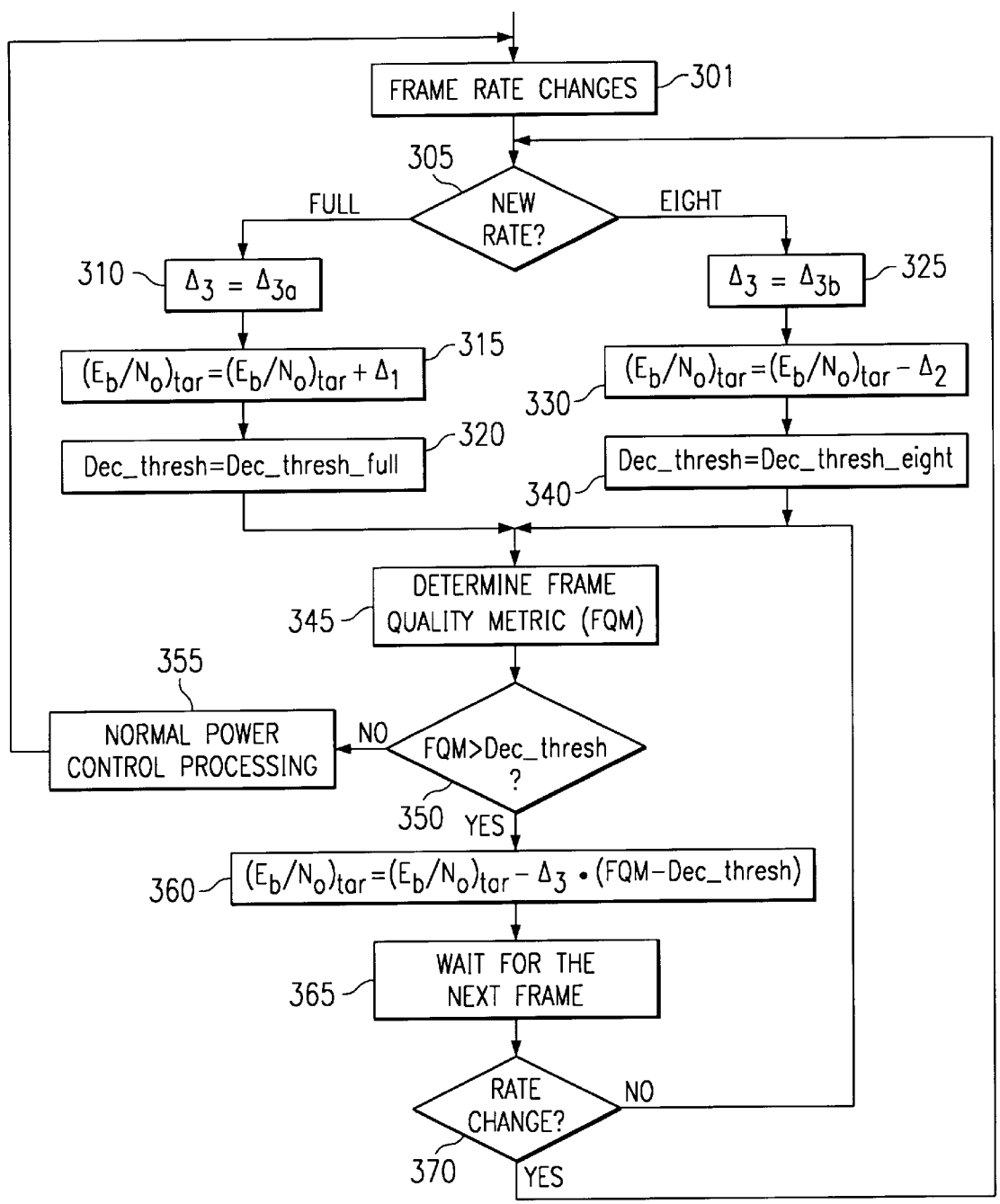
FIG. 3 shows a flowchart of an alternate embodiment target $E_b/N_o$ update process.
Figure 5:
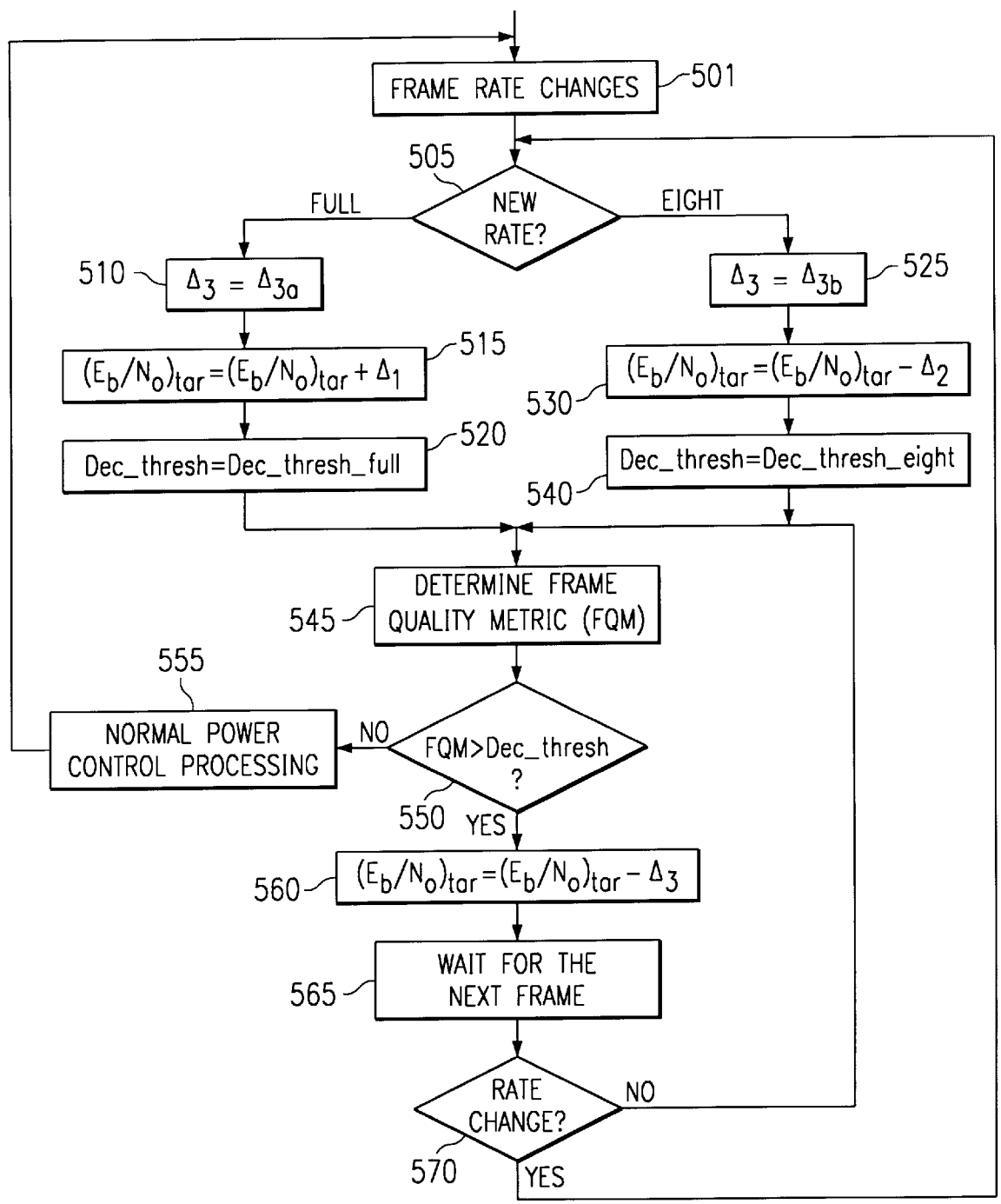
FIG. 5 shows a flowchart of an alternate embodiment target $E_b/N_o$ update process.

Flowcharts of alternate embodiments of the reverse link power control process of the present invention are illustrated in FIGS. 3 and 5. Both embodiments do not consider the need of tracking the previous stepping mechanism used. These embodiments could be used if all transitions were from full rate to eighth rate and vice versa. Additionally, the embodiments of FIGS. 3 and 5 are used in any instance where multiple increases of $\Delta_1$ or multiple decreases of $\Delta_2$ would not be a problem.

Referring to FIG. 5, the process initially monitors the channel for a frame rate change (step 501). The new rate is then determined (step 505). If the new rate is full rate, $\Delta_3$ is set to $\Delta_3$ a (step 510). The target $E_b/N_o$ is then increased by $\Delta_1$ (step 515).

If the new rate is full, the decision threshold is set at the Frame Quality Metric threshold for full rate frames (step 520). In the preferred embodiment, this threshold is 248. Alternate embodiments use other thresholds.

If the new rate is eighth rate, $\Delta_3$ is set to $\Delta_{3b}$ (step 525). The target is then decreased by $\Delta_2$ and the decision threshold is set to the Frame Quality Metric threshold for eighth rate frames (step 540). In the preferred embodiment, this threshold is 248. Alternate embodiments use other thresholds.

The Frame Quality Metric is next determined (step 545) using the above described process. The Frame Quality Metric is used by the process of the present invention to decrease the $E_b/N_o$ target steps at a much faster rate. Without the use of the Frame Quality Metric, if the rate changes rapidly, the target $E_b/N_o$ tends to continue increasing. If the target $E_b/N_o$ does not decrease to the operating value quickly before the next rate change, the $E_b/N_o$ will continue to increase until it hits the maximum $E_b/N_o$ target level. This is possible since $\Delta_2$ is typically less than $\Delta_1$. Hence, with rapid rate changes, the target quickly increases in steps of about $(\Delta_1 - \Delta_2)$dB. A correcting mechanism is therefore required.

The Frame Quality Metric is compared to the decision threshold (step 550) for that particular frame rate. If the Frame Quality Metric is less than the decision threshold, normal power control processing is performed (step 555) and the process returns to monitoring the frame rate (step 501).

If the Frame Quality Metric is larger than or equal to the decision threshold for that particular frame rate (step 550), the target $E_b/N_o$ is decreased by a predetermined $\Delta_3$. This operation is illustrated as follows:

$$(E_b/N_o) = (E_b/N_o)_{tar} - \Delta_3.$$

The process then waits for the next frame to be received (step 565) and determines if the frame rate has changed again (step 570). If the frame rate has changed again, the process returns to determining the new rate (step 205). If the frame rate has not changed with the next frame, the new Frame Quality Metric is determined (step 545) and the process continues as described above (steps 550–565) until the frame rate changes again.

FIG. 3 illustrates another alternate embodiment of the process of the present invention. The process initially monitors the channel for a frame rate change (step 301).

The new rate is then determined (step 305). If the new rate is full rate, $\Delta_3$ is set to $\Delta_{3a}$ (step 310). The target $E_b/N_o$ is then increased by $\Delta_1$ (step 315).

If the new rate is full, the decision threshold is set at the Frame Quality Metric threshold for full rate frames (step 320). In the preferred embodiment, this threshold is 248. Alternate embodiments use other thresholds.

If the new rate is eighth rate, $\Delta_3$ is set to $\Delta_{3b}$ (step 325). The target is then decreased by $\Delta_2$ and the decision threshold is set to the Frame Quality Metric threshold for eighth rate frames (step 340). In the preferred embodiment, this threshold is 248. Alternate embodiments use other thresholds.

The Frame Quality Metric is next determined (step 345) using the above described process. The Frame Quality Metric is compared to the decision threshold (step 350) for that particular frame rate. If the Frame Quality Metric is less than the decision threshold, normal power control processing is performed (step 355) and the process returns to monitoring the frame rate (step 301).

If the Frame Quality Metric is larger than or equal to the decision threshold for that particular frame rate (step 350), the target $E_b/N_o$ is decreased by a scaled $\Delta_3$. Multiplying $\Delta_3$ with the difference between the Frame Quality Metric (FQM) and the decision threshold accomplishes the scaling. This operation is illustrated by the following:

$$(E_b/N_o) = (E_b/N_o)_{tar} - \Delta_3(FQM-Dec. Threshold).$$

The scaling operation is performed as a form of weighting. In other words, the target $E_b/N_o$ is reduced by a greater amount if the frame quality is very good and a lesser amount if the frame quality is not as good. If $\Delta_3$ is not chosen properly, the process of the present invention may not operate efficiently. However, since the environment of a moving radiotelephone may change rapidly, the scaled $\Delta_3$ may not provide as robust a target adjustment as the preferred process illustrated in FIG. 2.

The process then waits for the next frame to be received (step 365) and determines if the frame rate has changed again (step 370). If the frame rate has changed again, the process returns to determining the new rate (step 305). If the frame rate has not changed with the next frame, the new Frame Quality Metric is determined (step 345) and the process continues as described above (steps 350–365) until the frame rate changes again.

In the preferred embodiment, the quarter and half rates do not require the above described power control processes. This is because they are transition rates and rarely last longer than a few milliseconds. However, in alternate embodiments, all rates may use the reverse link power control processes of the present invention.

Figure 4:
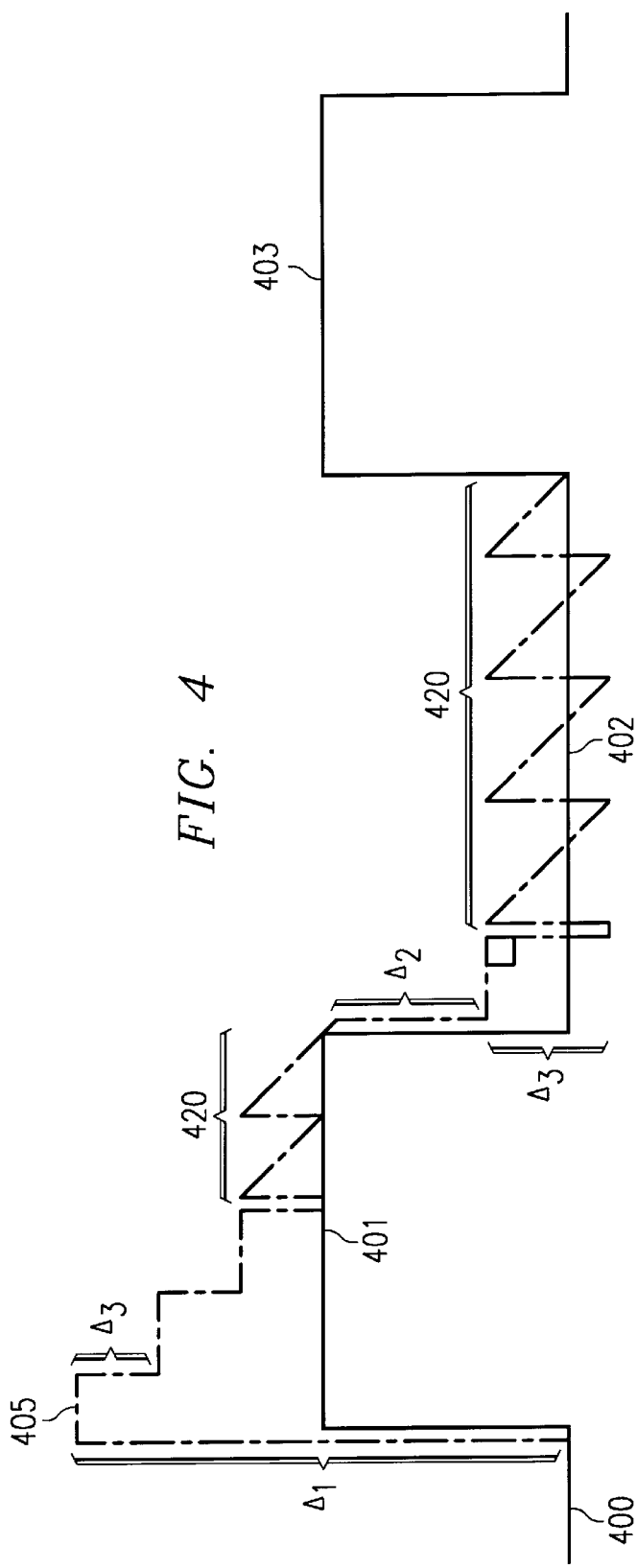
FIG. 4 shows a diagram of the processes of the present invention on the target $E_b/N_o$.

FIG. 4 illustrates the operation of the reverse link power control processes. This figure shows the required $E_b/N_o$ (400) changing for each frame rate change from full rate (401) to eighth rate (402) and back to full rate (403) again. Superimposed over the required $E_b/N_o$ for each rate are the $E_b/N_o$ targets (405) for each particular rate.

When the rate initially changes from eighth to full rate, the target $E_b/N_o$ increases by $\Delta_1$. This puts the target excessively above the required $E_b/N_o$ for full frame rate, thereby producing an FER that is much less than the target FER. This greatly lowers reverse link capacity.

To rapidly bring this target down to the required level, $\Delta_3$ is shown stepping down the target $E_b/N_o$ until it reaches the required level. After this, since the rate is remaining constant for the next few frames, the process reverts to the normal power control process (420).

When the speaker on the reverse link pauses, the frame rate changes from full rate (401) to eighth rate (402). The target $E_b/N_o$ is then reduced by $\Delta_2$. Since the target $E_b/N_o$ is still above the required $E_b/N_o$, $\Delta_3$ is used to step the target $E_b/N_o$ down to, or just below, the required level. Since the next few frames are at the same eighth rate, the normal power control process (420) is used.

In the preferred embodiment, $\Delta_3$ for the above-described processes is set to a different value for each different rate. In this embodiment, the $\Delta_3$ values are optimized for the environment. In the embodiments of the present invention, for example, full rate has a $\Delta_3$ of $\Delta_{3a}$ while eighth rate has a $\Delta_3$ of $\Delta_{3b}$. In an alternate embodiment, $\Delta_3$ is the same for all rates.

Once the target $E_b/N_o$ is found using the processes described above, the power of the transmitter is adjusted in order to meet the target $E_b/N_o$. This power control is well known in the art such as the power control illustrated in the IS-95 specification.

In summary, the above described reverse link power control processes rapidly updates reverse link power requirements during rate changes. By optimizing the power control using the Frame Quality Metric, the reverse link capacity is greatly improved.

We claim:

1. A method for updating a target system performance metric in a digital radiotelephone system comprising base stations and a radiotelephone, frames of data are communicated between the radiotelephone and the base stations, each frame communicated at one of a plurality of frame rates, the method comprising the steps of:

determining if the frame rate has changed;

if the frame rate changed from a lower frame rate to a higher frame rate, increasing the target system performance metric by a first predetermined delta to create an updated target metric;

if the frame rate changed from the higher frame rate to the lower frame rate, decreasing the target system performance metric by a second predetermined delta to create the updated target metric;

determining a frame quality threshold;

determining a frame quality metric for the communicated frames; and if the frame quality metric is greater than the frame quality threshold, subtracting a third predetermined delta from the updated target metric.

2. The method of claim 1 wherein the first, second, and third predetermined deltas are each a function of the environment.

3. The method of claim 1 and further including the step of scaling the third predetermined delta prior to subtracting from the updated target metric.

4. The method of claim 1 wherein the frame quality threshold is a function of the frame rate.

5. A reverse link power control method for controlling power in a digital radiotelephone system during frame rate changes, the system comprising base stations and a radiotelephone that communicate frames over a channel, each frame being transmitted at a first frame rate of a plurality of frame rates, the channel having a target performance metric, the method comprising the steps of:

monitoring the channel for a frame rate change;

if the frame rate changed from a lower frame rate to a higher frame rate, increasing the target performance metric by a first predetermined delta to create an updated target metric;

if the frame rate changed from the higher frame rate to the lower frame rate, decreasing the target performance metric by a second predetermined delta to create the updated target metric;

determining a frame quality threshold in response to the frame rate change;

determining a frame quality metric for each frame;

if the frame quality metric is greater than or equal to the frame quality threshold, subtracting a third predetermined delta from the updated target metric to produce a required target metric; and adjusting the reverse link power in response to the required target metric.

6. The method of claim 5 wherein the various frame rates include full, half, quarter, and eighth rate and the higher frame rate is equal to full rate and the lower frame rate is equal to eighth rate.

7. A reverse link power control method for controlling power in a digital radiotelephone system during frame rate changes, the system comprising base stations and a radiotelephone that communicate frames over a channel, each frame being transmitted at a first frame rate of a plurality of frame rates, the channel having a target bit-energy-to-noise-density ratio, the method comprising the steps of:

monitoring the channel for a frame rate change;

if the frame rate changed from a lower frame rate to a higher frame rate, increasing the target bit-energy-to-noise-density ratio by a first predetermined delta to create an updated target metric;

if the frame rate changed from the higher frame rate to the lower frame rate, decreasing the target bit-energy-to-noise-density ratio by a second predetermined delta to create the updated target metric;

determining a frame quality threshold in response to the frame rate change;

determining a frame quality metric for each frame;

if the frame quality metric is greater than or equal to the frame quality threshold, subtracting a third predetermined delta from the updated target metric to produce a required bit-energy-to-noise-density ratio; and adjusting the reverse link power in response to the required bit-energy-to-noise-density ratio.

8. The method of claim 7 and further including the steps of:

if the frame quality metric is less than the frame quality threshold, measuring a bit-energy-to-noise-density ratio over a power control group; and adjusting the reverse link power in response to the measured bit-energy-to-noise-density ratio.

9. A method for updating a target system performance metric in a digital radiotelephone system comprising base stations and a radiotelephone, frames of data are communicated between the radiotelephone and the base stations, each frame communicated at one of a plurality of frame rates, the method comprising the steps of:

determining if the frame rate has changed;

if the target system performance metric was previously changed by a first predetermined delta, setting a first flag;

if the target system performance metric was previously changed by a second predetermined delta, setting a second flag;

if the frame rate changed from a lower frame rate to a higher frame rate and the first flag is not set, increasing the target system performance metric by a first predetermined delta to create an updated target metric;

if the frame rate changed from the higher frame rate to the lower frame rate and the second flag is not set, decreasing the target system performance metric by a second predetermined delta to create the updated target metric;

determining a frame quality threshold;

determining a frame quality metric for the communicated frames; and if the frame quality metric is greater than the frame quality threshold, subtracting a third predetermined delta from the updated target metric.

10. The method of claim 9 wherein the higher frame rate is full rate and the lower frame rate is eighth rate.

11. A method for updating a target system performance metric in a digital radiotelephone system comprising base stations and a radiotelephone, frames of data are communicated between the radiotelephone and the base stations, each frame communicated at one of a plurality of frame rates, the method comprising the steps of:

setting an indicator equal to a previously used step controlling mechanism;

determining if the frame rate has changed;

if the frame rate changed from a lower frame rate to a higher frame rate and the indicator is not equal to a first predetermined delta, increasing the target system performance metric by the first predetermined delta to create an updated target metric;

if the frame rate changed from the higher frame rate to the lower frame rate and the indicator is not equal to a second predetermined delta, decreasing the target system performance metric by the second predetermined delta to create the updated target metric;

determining a frame quality threshold;

determining a frame quality metric for the communicated frames; and if the frame quality metric is greater than the frame quality threshold, subtracting a third predetermined delta from the updated target metric.

12. The method of claim 11 wherein the higher frame rate is full rate and the lower frame rate is eighth rate.

* * * * *